US010717589B2

(12) United States Patent
    Lu

(10) Patent No.: US 10,717,589 B2
(45) Date of Patent: Jul. 21, 2020

(54) STEEL PIPE SUPPORT AND STEEL PIPE SUPPORTING DEVICE

(71) Applicant: ZHEJIANG TIANYI MACHINERY CO., LTD., Zhejian (CN)

(72) Inventor: Gengshen Lu, Zhejiang (CN)

(73) Assignee: ZHEJIANG TIANYI MACHINERY CO., LTD., Zhejiang (CN)

(*) Notice: Subject to any disclaimer, the term of this patent is extended or adjusted under 35 U.S.C. 154(b) by 75 days.

(21) Appl. No.: 15/569,768

(22) PCT Filed: Sep. 14, 2015

(86) PCT No.: PCT/CN2015/089487
§ 371 (c)(1),
(2) Date: Oct. 27, 2017

(87) PCT Pub. No.: WO2016/201799
PCT Pub. Date: Dec. 22, 2016

(65) Prior Publication Data
US 2018/0134483 A1 May 17, 2018

(30) Foreign Application Priority Data
Jun. 15, 2015 (CN) .......................... 2015 1 0327559

(51) Int. Cl.
B65D 85/20 (2006.01)
B65D 61/00 (2006.01)

(52) U.S. Cl.
CPC ............. B65D 85/20 (2013.01); B65D 61/00 (2013.01)

(58) Field of Classification Search
CPC . B65D 61/00; B65D 85/20; F16L 3/00; F16L 3/08; F16L 3/22; F16L 3/2235; F16L 3/223; F16L 3/237
(Continued)

(56) References Cited

U.S. PATENT DOCUMENTS 1,921,228 A * 8/1933 Hetherington ......... B65D 57/00
                                               206/585
2,404,531 A * 7/1946 Robertson ............. F16L 3/2235
                                               248/68.1
(Continued)

FOREIGN PATENT DOCUMENTS

CN      1055522      10/1991
CN      1190634       8/1998
(Continued)

OTHER PUBLICATIONS

"International Search Report (Form PCT/ISA/210)", dated Feb. 22, 2016, with English translation thereof, pp. 1-4.

Primary Examiner — Jonathan Liu
Assistant Examiner — Devin K Barnett
(74) Attorney, Agent, or Firm — JCIPRNET

(57) ABSTRACT

A steel pipe support and a steel pipe supporting device. The steel pipe support comprises a steel pipe supporting part, a supporting inner core arranged inside the steel pipe supporting part, steel pipe storage grooves formed in the steel pipe supporting part and arranged along the length direction of the steel pipe supporting part and spacing parts arranged between every two adjacent steel pipe storage grooves; and each of the steel pipe storage grooves is internally provided with at least two first supporting rib plates located at one side of the center section of the steel pipe storage groove and/or at least two second supporting rib plates located at the other side of the center section of the steel pipe storage groove, first recessed grooves are formed between every two adjacent first supporting rib plates, and second recessed grooves are formed between every two adjacent second supporting rib plates.

18 Claims, 7 Drawing Sheets

(58) Field of Classification Search
USPC ... 211/60.1, 59.4, 70.4, 13, 194, 182, 85.18; 410/36, 42; 206/443, 499; 248/65, 68.1
See application file for complete search history.

(56) References Cited

U.S. PATENT DOCUMENTS

| | | | | |
|---|---|---|---|---|
| 2,766,660 | A * | 10/1956 | Laddon | B64D 1/04 89/1.51 |
| 2,849,027 | A * | 8/1958 | Tetyak | F16L 3/227 138/112 |
| 3,422,884 | A * | 1/1969 | Otten | F16L 3/2235 165/67 |
| 3,458,163 | A * | 7/1969 | Egerton-Smith | H02G 3/32 248/67.5 |
| 3,464,661 | A * | 9/1969 | Alesi, Jr. | F16L 3/2235 248/68.1 |
| 3,531,071 | A * | 9/1970 | Kubli | F16L 3/2235 248/68.1 |
| 3,682,422 | A * | 8/1972 | Evans | F16L 3/2235 248/68.1 |
| 3,742,119 | A * | 6/1973 | Newman | H02B 1/305 174/155 |
| 3,857,598 | A * | 12/1974 | Jelich | B65D 61/00 248/153 |
| 4,117,998 | A * | 10/1978 | Notoya | H02G 3/083 16/2.1 |
| 4,195,732 | A * | 4/1980 | Bell | B65D 19/44 206/386 |
| 4,378,923 | A * | 4/1983 | Takei | B65D 61/00 108/51.3 |
| 4,435,463 | A * | 3/1984 | Roellchen | B26D 3/006 108/901 |
| 4,506,796 | A * | 3/1985 | Thompson | A47B 81/007 108/55.3 |
| 4,610,362 | A * | 9/1986 | Remp | F16L 3/2235 206/443 |
| 4,618,114 | A * | 10/1986 | McFarland | F16L 3/13 248/220.21 |
| 4,705,170 | A * | 11/1987 | Creaden | B65D 1/36 206/419 |
| 4,706,822 | A * | 11/1987 | Remp, Jr. | B65D 85/20 206/443 |
| D301,013 | S * | 5/1989 | Creaden | D9/456 |
| 4,832,196 | A * | 5/1989 | Butler | B65D 19/44 206/391 |
| 5,060,810 | A * | 10/1991 | Jones | A47F 7/0035 211/4 |
| 5,080,314 | A * | 1/1992 | Moyer | B65D 19/44 206/391 |
| 5,098,047 | A * | 3/1992 | Plumley | F16L 3/2235 248/68.1 |
| 5,104,072 | A * | 4/1992 | Kuo | F16L 3/2235 248/222.12 |
| 5,123,547 | A * | 6/1992 | Koch | F16L 3/2235 211/59.4 |
| 5,161,703 | A * | 11/1992 | Patton | A47F 7/281 206/446 |
| D332,571 | S * | 1/1993 | Creaden | D9/434 |
| 5,267,648 | A * | 12/1993 | Baker | B65D 61/00 206/446 |
| 5,499,716 | A * | 3/1996 | Gardner | B65D 71/70 206/499 |
| 5,513,820 | A * | 5/1996 | Meyer | B65H 75/185 215/355 |
| D381,180 | S * | 7/1997 | Schueneman | D34/38 |
| 5,649,632 | A * | 7/1997 | Terashima | F16L 3/22 211/59.4 |
| D385,080 | S * | 10/1997 | Schueneman | D34/38 |
| 5,685,686 | A * | 11/1997 | Burns | B60R 9/06 224/282 |
| 5,755,541 | A * | 5/1998 | Suarez | B60P 7/12 211/59.4 |
| D400,441 | S * | 11/1998 | Warren | D9/456 |
| 5,899,331 | A * | 5/1999 | Warren, Jr. | B65D 71/70 206/389 |
| 5,941,483 | A * | 8/1999 | Baginski | F16L 3/22 248/68.1 |
| 5,992,802 | A * | 11/1999 | Campbell | H02G 3/30 248/68.1 |
| 6,119,861 | A * | 9/2000 | Schneider | B65D 61/00 108/53.1 |
| D431,427 | S * | 10/2000 | Syvuk | D7/708 |
| 6,209,839 | B1 * | 4/2001 | O'Malley | B65D 19/44 248/346.02 |
| 6,283,310 | B1 * | 9/2001 | Dean | B60R 9/048 211/17 |
| 6,425,509 | B1 * | 7/2002 | Dean | B60R 9/048 211/20 |
| 6,431,372 | B1 * | 8/2002 | Aoyama | A47B 87/0215 206/446 |
| D470,053 | S * | 2/2003 | Gratz | D9/456 |
| 6,590,160 | B1 * | 7/2003 | Dopfl | F16L 5/04 174/152 G |
| D480,306 | S * | 10/2003 | Gratz | D9/456 |
| D485,161 | S * | 1/2004 | Hutchinson | D8/383 |
| 6,717,055 | B2 * | 4/2004 | Kato | B60R 16/0215 173/136 |
| 6,968,864 | B2 * | 11/2005 | Miyamoto | B60R 16/0215 138/108 |
| D518,720 | S * | 4/2006 | Gratz | D9/456 |
| 7,044,358 | B2 * | 5/2006 | Gratz | B65D 71/70 206/394 |
| 7,080,864 | B2 * | 7/2006 | Casteran | B65D 85/20 211/60.1 |
| 7,117,994 | B2 * | 10/2006 | Gratz | B65D 71/70 206/446 |
| 7,448,505 | B2 * | 11/2008 | DeMent | B60P 7/12 211/59.4 |
| 7,770,848 | B2 * | 8/2010 | Johnson | F16L 3/1207 248/65 |
| 7,781,684 | B2 * | 8/2010 | Stuckmann | H02G 3/088 16/2.1 |
| D628,071 | S * | 11/2010 | He | D9/456 |
| 7,984,806 | B2 * | 7/2011 | Matheou | A47B 73/008 206/427 |
| 8,011,865 | B2 * | 9/2011 | Anderson | B61D 45/003 410/117 |
| 8,210,407 | B2 * | 7/2012 | Sautter | B60R 9/048 224/315 |
| 8,356,778 | B2 * | 1/2013 | Birli | F16L 3/127 248/65 |
| 8,464,986 | B1 * | 6/2013 | McClure | F16L 3/1075 248/229.13 |
| 8,596,589 | B2 * | 12/2013 | Hennon | F16L 3/222 248/65 |
| 8,702,044 | B2 * | 4/2014 | Railsback | F16L 3/2235 248/229.22 |
| 8,757,560 | B2 * | 6/2014 | Darnell | H02G 3/0456 174/68.1 |
| 8,807,492 | B2 * | 8/2014 | Lake | F16L 3/222 248/65 |
| 8,807,612 | B2 * | 8/2014 | Hagelskjaer | B65D 85/62 211/60.1 |
| D715,744 | S * | 10/2014 | Millevik | D13/155 |
| 8,915,682 | B2 * | 12/2014 | Mulanon | F17C 13/084 410/50 |
| 8,985,529 | B2 * | 3/2015 | Masters | F16L 3/223 248/176.1 |
| 9,038,968 | B2 * | 5/2015 | Hennon | F16L 3/1091 248/65 |
| D772,047 | S * | 11/2016 | McCoy | D8/354 |
| D772,048 | S * | 11/2016 | McCoy | D8/354 |
| 9,528,636 | B2 * | 12/2016 | Beele | F16L 5/10 |
| D794,433 | S * | 8/2017 | McCoy | D8/354 |
| D795,047 | S * | 8/2017 | McCoy | D8/354 |
| 9,738,228 | B2 * | 8/2017 | Bogoslofski | B60R 9/08 |
| 2002/0063194 | A1 * | 5/2002 | O'malley | B65D 19/44 248/346.02 |

(56) References Cited

U.S. PATENT DOCUMENTS

| | | | | |
|---|---|---|---|---|
| 2003/0183733 A1* | 10/2003 | Pisczak | .................. | H02G 7/053 |
| | | | | 248/74.1 |
| 2003/0205907 A1* | 11/2003 | Casteran | ................ | B65D 85/20 |
| | | | | 294/67.3 |
| 2004/0124320 A1* | 7/2004 | Vantouroux | .......... | F16L 3/1091 |
| | | | | 248/68.1 |
| 2004/0164209 A1* | 8/2004 | Pachao-Morbitzer | ....................... | |
| | | | | B65D 71/0092 |
| | | | | 248/68.1 |
| 2005/0067538 A1* | 3/2005 | Stigler | .................. | F16L 3/1008 |
| | | | | 248/65 |
| 2006/0032879 A1* | 2/2006 | Settelmayer | ............ | B60R 9/048 |
| | | | | 224/497 |
| 2007/0235489 A1* | 10/2007 | Jeli | .......................... | B60R 9/12 |
| | | | | 224/558 |
| 2007/0246614 A1* | 10/2007 | Allmann | ............... | F16L 3/2235 |
| | | | | 248/65 |
| 2010/0108825 A1* | 5/2010 | Brock | ....................... | F16L 1/06 |
| | | | | 248/73 |
| 2012/0093608 A1* | 4/2012 | Kovacs, Jr. | ............ | B65D 61/00 |
| | | | | 410/47 |
| 2012/0153095 A1* | 6/2012 | Child | .................... | F16L 3/2235 |
| | | | | 248/68.1 |
| 2016/0058182 A1* | 3/2016 | Langston | ........... | A47B 47/0091 |
| | | | | 211/85.22 |
| 2016/0362063 A1* | 12/2016 | McFadden | .............. | B60R 9/058 |
| 2017/0349113 A1* | 12/2017 | D'Angelo | ................. | B60R 9/10 |

FOREIGN PATENT DOCUMENTS

| | | |
|---|---|---|
| CN | 201049795 | 4/2008 |
| CN | 104875955 | 9/2015 |
| CN | 204713703 | 10/2015 |

\* cited by examiner

STEEL PIPE SUPPORT AND STEEL PIPE SUPPORTING DEVICE

CROSS-REFERENCE TO RELATED APPLICATION

This application is a 371 application of the international PCT application serial no. PCT/CN2015/089487, filed on Sep. 14, 2015, which claims the priority benefit of China application no. 201510327559.X, filed on Jun. 15, 2015. The entirety of each of the abovementioned patent applications is hereby incorporated by reference herein and made a part of this specification.

TECHNICAL FIELD

The invention relates to the technical field of pipe transportation and stacking and particularly relates to a steel pipe support and a steel pipe supporting device.

BACKGROUND ART

After being processed, steel pipes are required to be stacked and transported, and in order to prevent the processed steel pipes from being damaged in a stacking process or a transportation process, the steel pipes are placed on a supporting device in the stacking and transportation processes. The Chinese utility model patent with the patent number of CN 201049795U and the publication date of Apr. 23, 2010 discloses a steel pipe package stacking and transportation supporting device comprising a middle supporting part for spacing steel pipes from one another and a steel strapping strip for strapping a plurality of steel pipes, the middle supporting part is provided with upper and lower rows of arc grooves of which the shapes are adapted to those of the steel pipes, the middle supporting part is made of high-strength plastics, due to the adoption of the steel pipe package stacking and transportation supporting device disclosed by the utility model, mutual collision and friction among the steel pipes in strapping can be avoided, so that the surfaces of the steel pipes are prevented from being damaged.

However, the existing steel pipe stacking and transportation supporting device has the defect that the steel pipes may be rusted in actual application, and particularly, the steel pipes are more seriously rusted when being stacked or transported on the sea for a long time.

SUMMARY OF THE INVENTION

The invention aims at providing a steel pipe support and a steel pipe supporting device which can be used for overcoming defects in the prior art and are simple in structure, convenient to manufacture, low in cost and capable of effectively preventing steel pipes from being rusted particularly in the long-term stacking and sea transportation processes of the steel pipes.

The above technical aim of the invention is realized by the following technical scheme: the steel pipe support comprises a steel pipe supporting part, a supporting inner core arranged inside the steel pipe supporting part, a plurality of steel pipe storage grooves formed in the steel pipe supporting part and arranged along the length direction of the steel pipe supporting part, and spacing parts arranged between every two adjacent steel pipe storage grooves; and each of the steel pipe storage grooves is internally provided with at least two first supporting rib plates located at one side of the center section of the steel pipe storage groove and/or at least two second supporting rib plates located at the other side of the center section of the steel pipe storage groove, first recessed grooves are formed between every two adjacent first supporting rib plates, and second recessed grooves are formed between every two adjacent second supporting rib plates.

Found by an applicant after repeated researches and experiments, the existing steel pipe support or supporting device (for example, the example stated in the background) comprises a bracket (generally made of plastics, polyurethane and the like) and a steel inner core arranged in the bracket, the plastics have certain elasticity so as to avoid damaging surfaces of the steel pipes (and also avoid contact rusting caused by direct contact between metals), a plurality of axial grooves (axial directions herein refer to the axial extension directions of the steel pipes placed in the axial grooves) for placing the steel pipes are formed in the bracket, after the steel pipes are placed for a long time, and particularly, during sea transportation, the steel pipes, particularly, many high-quality coated steel pipes, for example, production strings for oil production, are partially rusted because of being in a high-temperature, high-humidity and high-salt environment for a long time, and it is found that the rusting of the surfaces of the steel pipes is caused by long-term water accumulation and extrusion on a contact part after the axial groove parts of the bracket are fitted with the surfaces of the steel pipes for a long time. Therefore, the existing support is improved by the applicant, the steel pipe storage grooves are provided with the first supporting rid plates and the second supporting rib plates along the axial directions (the axial directions of the steel pipes), the first supporting rib plates and the second supporting rib plates are symmetrically arranged or staggered relative to the center sections of the steel pipe storage grooves, the first recessed grooves are formed between every two adjacent first supporting rib plates, and the second recessed grooves are formed between every two adjacent second supporting rib plates; due to the adoption of the structure, the first supporting rib plates and the second supporting rib plates are in contact with the surfaces of the steel plates during use, so that the area in contact with the steel pipes is greatly reduced, the contact area between water and the steel pipes is reduced; in addition, due to the arrangement of the first recessed grooves and the second recessed grooves, not only can the drainage effect be achieved, but also a ventilation effect can be achieved, and the possibility that the steel pipes are rusted is greatly reduced by combination of the drainage effect and the ventilation effect.

Preferably, the surfaces, which are in contact with the steel pipes, of the first supporting rib plates and the second supporting rib plates are arc surfaces.

Due to the adoption of the arc surface structure, the first supporting rib plates and the second supporting rib plates can better support the steel pipes, and the supporting effect and the steel pipe protecting effect are guaranteed.

Preferably, the first supporting rib plates and the second supporting rib plates are symmetrically arranged or staggered at two sides of the center sections of the steel pipe storage grooves.

Preferably, the first supporting rib plates and the second supporting rib plates are equal-width plates or are gradually widened as being close to the bottom surfaces of the steel pipe storage grooves.

Preferably, the ends, close to the second supporting rib plates, of the first supporting rib plates are provided with first step surfaces intersected with the bottom surfaces of the steel pipe storage grooves, and the ends, close to the first supporting rib plates, of the second supporting rib plates are provided with second step surfaces intersected with the bottom surfaces of the steel pipe storage grooves.

Due to the arrangement of the first step surfaces and the second step surfaces, gaps are also formed between the steel pipes and the bottom surfaces of the steel pipe storage grooves after the steel pipes are placed on the steel pipe storage grooves, so that rusting caused by contact between the steel pipes and the bottom surfaces of the steel pipe storage grooves is avoided.

Preferably, first transition connecting plates are arranged between the first supporting rib plates and the side surfaces of the steel pipe storage grooves; and second transition connecting plates are arranged between the second supporting rib plates and the side surfaces of the steel pipe storage grooves.

Due to the arrangement of the first transition connecting plates and the second transition connecting plates, the ventilation and drainage performances of the two first supporting rib plates and the two second supporting rib plates can still be guaranteed even if the steel pipes are most fitted with the first supporting rib plates and the second supporting rib plates when the steel pipes are placed on the first supporting rib plates and the second supporting rib plates.

Preferably, vertical openings are formed in the top surfaces of the spacing parts; and the number of the vertical openings is set to be 2-5, spacing plates are arranged between every two adjacent vertical openings, and the positions of the spacing plates correspond to those of the first supporting rib plates and the second supporting rib plates.

Preferably, the thicknesses of the first supporting rib plates are equal to those of the second supporting rib plates, and the thicknesses of the spacing plates are larger than or equal to those of the first supporting rib plates.

Preferably, the spacing parts are solid spacing parts.

Preferably, reinforcing rib plates are arranged between each two adjacent first supporting rib plates and/or between every two adjacent second supporting rib plates; and the number of the reinforcing rib plates is set to be 1-5.

The reinforcing rib plates can improve the bearing capacity of the first supporting rib plates and the second supporting rib plates and guarantee the structural strength of the whole support.

Preferably, communicating holes are formed between the reinforcing rib plates and bottom surfaces of the first recessed grooves and between the reinforcing rib plates and the bottom surfaces of the second recessed grooves; and the communicating holes are openings which are formed in the reinforcing rib plates and communicate with the bottom surfaces of the reinforcing rib plates or gaps between the reinforcing rib plates and the bottom surfaces of the first recessed grooves and between the reinforcing rib plates and the bottom surfaces of the second recessed grooves.

Preferably, the first supporting rib plates and/or the second supporting rib plates are provided with a plurality of raised rib plates; and the cross sections of the raised rib plates are shaped like rectangles or isosceles trapezoids or arcs.

The first supporting rib plates and the second supporting rib plates are provided with a plurality of friction rib plates capable of increasing the friction force when being used for supporting the steel pipes so as to guarantee a placing effect; and the area in contact with the steel pipes can be further reduced. Preferably, at least one through groove is formed in the bottom surface of each of the steel pipe storage grooves.

Preferably, at least one axial through groove is formed in the bottom surface of each of the steel pipe storage grooves.

Due to the arrangement of the axial through groove, not only can water from the first recessed grooves and the second recessed grooves be drained, but also a ventilation effect can be achieved, and the steel pipes can be further prevented from being rusted.

Preferably, the steel pipe support also comprises transition insertion parts, each of the transition insertion part comprises an insertion part body, an arc groove formed in the insertion part body, a first locating block and a second locating block arranged on the insertion part body and matched with each of the first recessed grooves and each of the second recessed grooves and an end pressing plate arranged at the end of the insertion part body and in contact with each of the spacing parts.

In order to improve the adaptability of the whole support and ensure that the steel pipes with various specifications can be placed on the support, the transition insertion parts are arranged by the applicant, and the transition insertion parts are placed in the steel pipe storage grooves to support the stored steel pipes when being required.

The steel pipe supporting device comprises a plurality of steel pipe supports sequentially arranged in parallel from bottom to top and two vertical connecting mechanisms arranged at two ends of the plurality of steel pipe supports and used for connecting the plurality of steel pipe supports together.

Preferably, each of the vertical connecting mechanisms comprises a pull rod, an upper connecting plate arranged on the steel pipe support located at the topmost, a pull rod passing hole formed in the upper connecting plate, a lower connecting plate arranged on the steel pipe support located at the bottommost, a lower lateral pull rod clamping slot arranged in the lower connecting plate, middle connecting blocks arranged on the rest steel pipe supports, middle lateral pull rod clamping slot formed in the middle connecting blocks, a threaded section arranged at the upper end of the pull rod, a fastening nut in threaded connection with the threaded section, a pull-away preventing part arranged at the lower end of the pull rod and used for preventing the pull rod from being vertically pulled away from the lower lateral pull rod clamping slot and a lateral barrier plate used for preventing the pull-away preventing part from sliding outwards.

Firstly, the middle lateral pull rod clamping slot and the lower lateral pull rod clamping slot jointly form a channel allowing the pull rod to be laterally placed into; after the pull rod is laterally placed into the channel, the pull-away preventing part is vertically blocked by a lifting action; then, by screwing the nut at the upper end into the threaded section at the upper end of the pull rod, it is ensured that the pull rod cannot vertically move; and meanwhile, the pull-away preventing part is laterally limited by the lateral barrier plate, so as to ensure that the pull rod cannot laterally slide out of the channel.

Compared with the existing structure, the steel pipe supporting device adopting the vertical connecting mechanisms has the advantages that as shown in FIG. 1 of a U.S. Pat. No. 7,080,864 B2, several steel pipe supporting devices (generally 2-4) are required for hoisting a bundle of steel pipes, and each steel pipe supporting device is composed of a plurality of supports (equivalent to the steel pipe supports in the present application) and fixed parts (equivalent to the vertical connecting mechanisms in the application) at two sides of the supports.

A mounting way is as follows:

firstly, each layer of bracket is connected with the insertion part corresponding to the bracket. For example, two ends of the bracket located at the bottommost layer are connected with two insertion parts at the bottom layer; two ends of the bracket located at the middle layer are connected with two U-shaped parts; and the bracket located at the topmost layer is connected with two insertion parts at the upper layer. Then, a plurality of supports at the bottom layer are placed on a working platform according to the number of the bundled supports, to guarantee that grooves of the supports are axially aligned so as to place the steel pipes; next, a first layer of steel pipes are placed on the bracket at the bottommost layer; then, the bracket at the middle layer is placed on the first layer of steel pipes, and then, the steel pipes are placed on the bracket at the middle layer, the process is repeated in such a way, and finally, the bracket at the topmost layer is placed. Thus, the placement of the steel pipes and the supports is completed.

Then, the next step is performed, and every bracket is fixed.

According to the supports of the U.S. Pat. No. 7,080,864 B2, at the moment, two screw rods are required to sequentially pass through upper insertion parts, U-shaped insertion parts and lower insertion parts from top to bottom and are finally screwed into nuts preassembled and fixed in the lower insertion parts, then, the nuts at the top layer are screwed into the upper ends of the screw rods, and thus, the whole device is locked, wherein alignment is relatively difficult in the mounting process of the screw rods and is required to be operated by personnel at the side where a lateral pull rod mechanism is located, next, it is also very strenuous to transfer a torque, and the screw rods are required to be clamped by a fixture so as to be screwed in.

Otherwise, if the vertical connecting mechanisms are used, the steps of twisting pull rods and sleeving the nuts are directly omitted, the pull rods are directly placed in from the sides of the lower insertion parts, are then lifted and tensioned and are finally locked by the nuts at the upper ends. A certain allowance is designed for a workpiece, so that the very precise alignment like nut placement is not needed during side placement, the operation can be completed at one side of the working platform by operating personnel, and the defect that operation at two sides cannot be realized due to limit fields of some factories is overcome; in addition, the time-consuming operation that the pull rods are wrenched by using a tool to be fixed on the nuts is omitted, and meanwhile, the tool is saved.

Preferably, an anti-rotation part matched with the middle lateral pull rod clamping slot for preventing the pull rod from rotating is arranged between the pull rod and a pull-away preventing part; the anti-rotation part is provided with two anti-rotation sides matched with the middle lateral pull rod clamping slot; a pair of mutually matched locating planes is arranged between the pull-away preventing part and the bottom of the lower connecting plate; and the pull rod, the pull-away preventing part and the anti-rotation part are integrally molded or are welded into a whole.

The anti-rotation part is arranged in order to prevent the whole pull rod from rotating when the fastening nut is rotated, and meanwhile, the anti-rotation part can also be matched with the lower lateral pull rod clamping slot to play guiding and locating roles.

In conclusion, the invention has the following beneficial effects of simple structure, convenience in manufacture, low cost, capability of preventing the steel pipes from being rusted, high structural strength and good steel pipe protection effect.

DETAILED DESCRIPTION OF THE INVENTION

Figure 1:
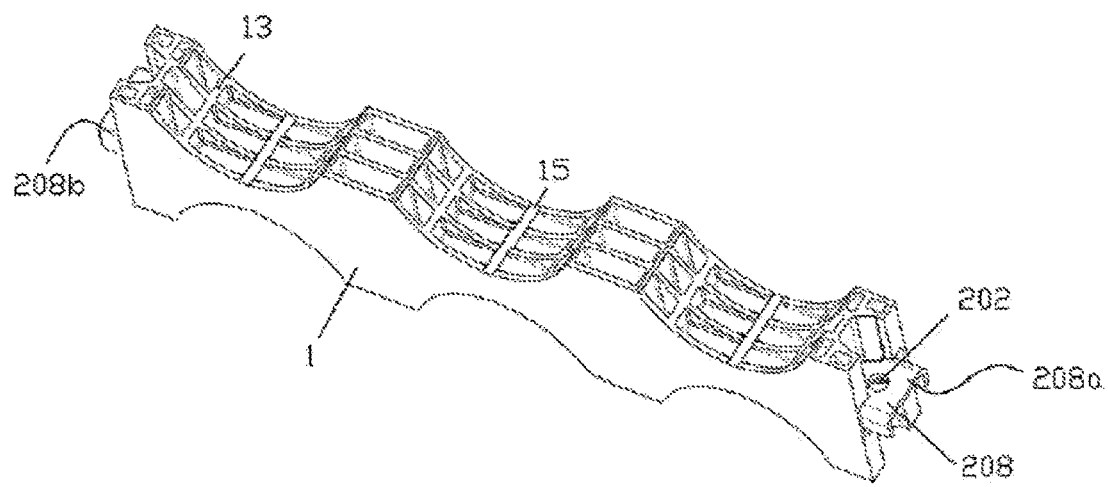
FIG. 1 is a schematic diagram of an embodiment 1 of a steel pipe support of the invention, and an upper connecting plate is placed on the steel pipe support.
Figure 2:
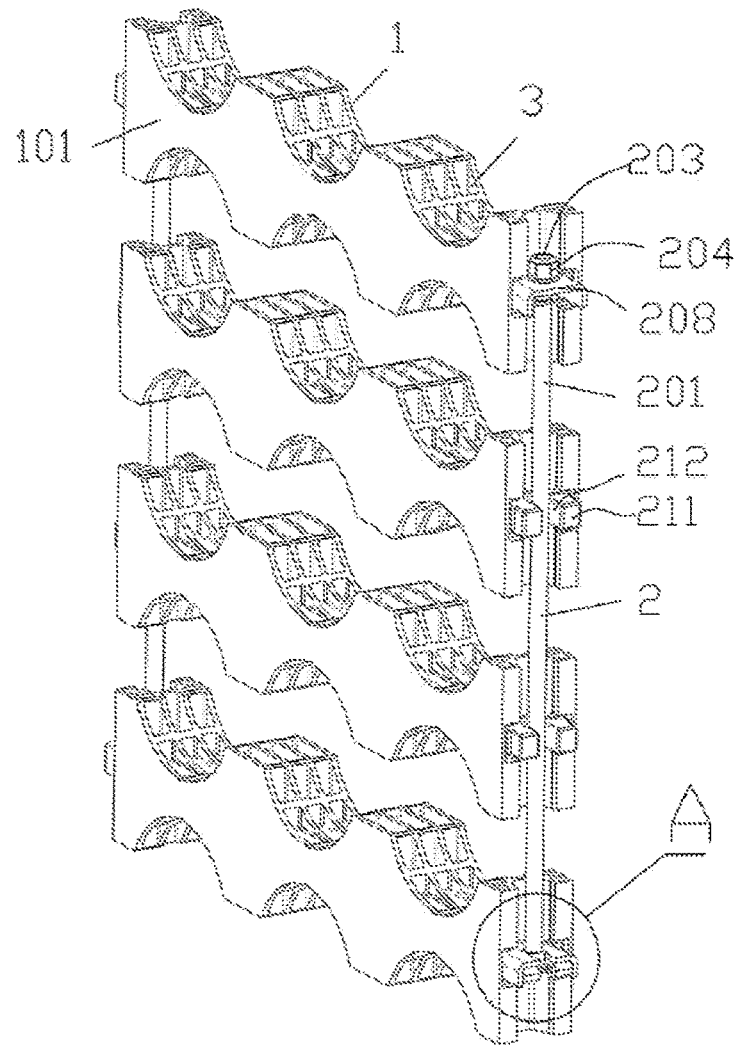
FIG. 2 is a schematic diagram of a steel pipe supporting device of the invention.
Figure 3:
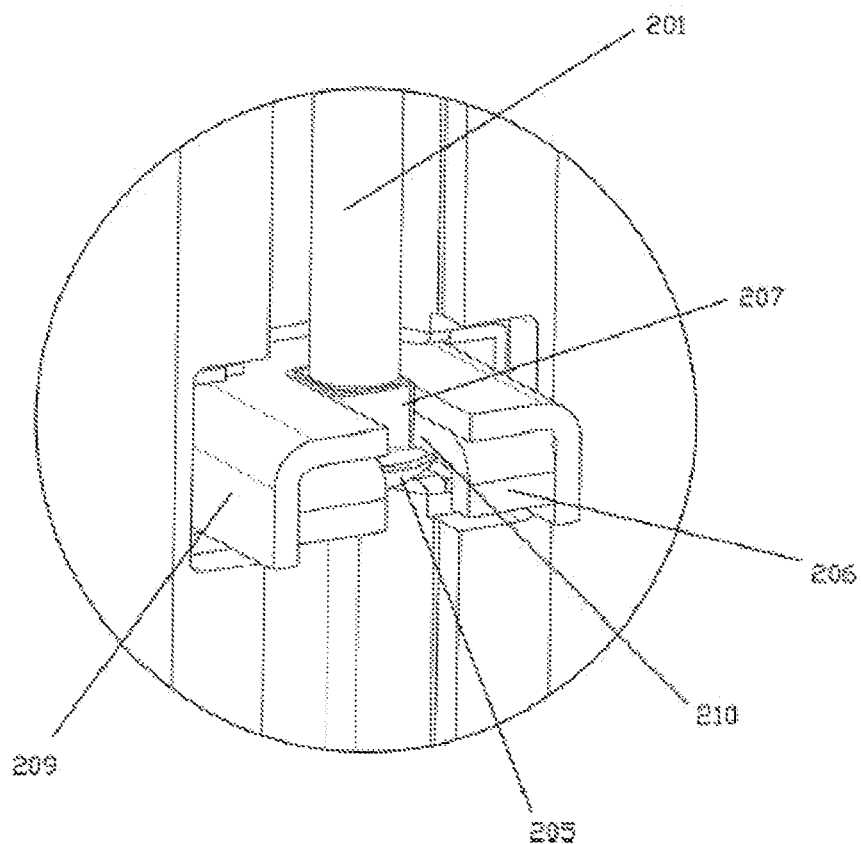
FIG. 3 is a partial enlarged view of a part A in the FIG. 2.
Figure 4:
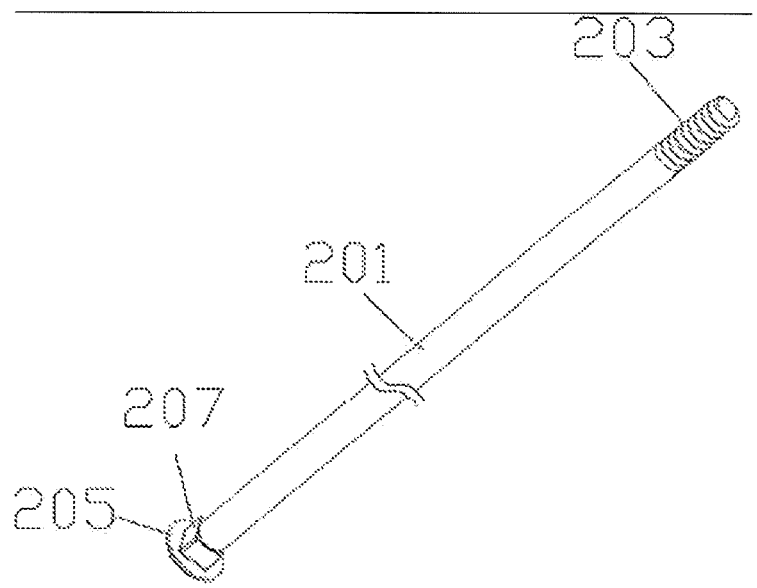
FIG. 4 is a schematic diagram of a pull rod in FIG. 2.

The invention is further described in detail below in conjunction with the drawings.

The embodiments are only to be considered as explanation rather than limiting, those skilled in the art can make modification without creative contribution for the embodiments as required after reading the description, and the modification is protected by the patent law if the modification falls within the scope of claims of the invention.

Embodiment 1: as shown in FIGS. 1, 2, 3 and 4, a steel pipe support comprises a steel pipe supporting part 101, a supporting inner core 102 arranged inside the steel pipe supporting part 101, a plurality of steel pipe storage grooves 3 formed in the steel pipe supporting part 101 and arranged along the length direction of the steel pipe supporting part 101 and spacing parts 4 arranged between every two adjacent steel pipe storage grooves 3; the steel pipe supporting part 101 is made of plastics or polyurethane with certain elasticity so as to avoid damaging steel pipes, and is generally a cuboid or an approximate cuboid; the supporting inner core 102 is made of a hard material which generally adopts a square steel pipe, and the spacing parts 4 are arranged between every two adjacent steel pipe storage grooves 3 in the length direction of the steel pipe supporting part 101; each of the steel pipe storage grooves 3 is internally provided with at least two first supporting rib plates 5 located at one side of the center section of the steel pipe storage groove 3 or at least two second supporting rib plates 6 located at the other side of the center section of the steel pipe storage groove 3, preferably, the at least two first supporting rib plates 5 and the at least two second supporting rib plates 6 are respectively arranged at two sides of the center section of the steel pipe storage groove 3; first recessed grooves 7 are formed between every two adjacent first supporting rib plates 5, and second recessed grooves 8 are formed between every two adjacent second supporting rib plates 6. The number of the first supporting rib plates 5 and the second supporting rib plates 6 are set according to actual demands and can be 2, 3, 4, 5, 6, 7, 8, 9, 10, 11, 12, 13 and the like, and preferably 3-8; the spacing distance can also be regulated as required, wherein the sides of the two first supporting rib plates 5 located at the outmost side in the width direction are flush with two sides in the width direction of the steel pipe supporting part 101, and the sides of the two second supporting rib plates 6 located at the outmost side in the width direction (namely the axial direction of the steel pipes) of the steel pipe supporting part 101 are flush with two sides in the width direction of the steel pipe supporting part 101; generally, the first supporting rib plates, the second supporting rib plates and the steel pipe supporting parts 101 are integrally molded by injection; the first supporting rib plates 5 and the second supporting rib plates 6 are equal-width plates or are gradually widened as being close to the bottom surfaces of the steel pipe storage grooves 3, so that the cross sections of the first supporting rib plates 5 and the second supporting rib plates 6 is shaped like a trapezoid or an arc or an approximate trapezoid. In order to improve the steel pipe supporting effect, the surfaces, which are in contact with the steel pipes, of the first supporting rib plates 5 and the second supporting rib plates 6 are arc surfaces; further, each of the steel pipe storage grooves 3 comprises a first side surface 301, a second side surface 302 and a bottom surface 303 connected with the first side surface 301 and the second side surface 302, and the bottom surface 303 is a plane or an arc or the bottom surface 303 is two intersected inclined planes; the first side surface 301 and the second side surface 302 are vertical planes, and the arc bottom surface at least partially extends into each of the first recessed grooves 7 and each of the second recessed grooves 8; and meanwhile, at least one axial through groove 15 is formed in the bottom surface of each of the steel pipe storage grooves 3, and preferably, the cross section of the axial through groove 15 is shaped like a rectangle or an arc or a trapezoid.

In the implementation, the first supporting rib plates 5 and the second supporting rib plates 6 are symmetrically arranged relative to the center sections of the steel pipe storage grooves or are arranged at intervals, and the symmetrical arrangement is relatively beneficial to the supporting; the spacing parts 4 can be solid spacing parts, or vertical openings 14 are formed in the top surfaces of the spacing parts, and the material consumption can be reduced due to the arrangement of the vertical openings 14; the number of the vertical openings 14 is set to be 2-8, spacing plates 20 are arranged between every two adjacent vertical openings 14, and the positions of the spacing plates 20 correspond to those of the first supporting rib plates 5 and the second supporting rib plates 6; and the positions of the spacing plates 20 correspond to those of the first supporting rib plates 5 and the second supporting rib plates 6, so that the positions of the first supporting rib plates 5 and the second supporting rib plates 6 can be better correspondingly supported, and the thicknesses of the first supporting rib plates 5 are equal to those of the second supporting rib plates 6.

Figure 10:
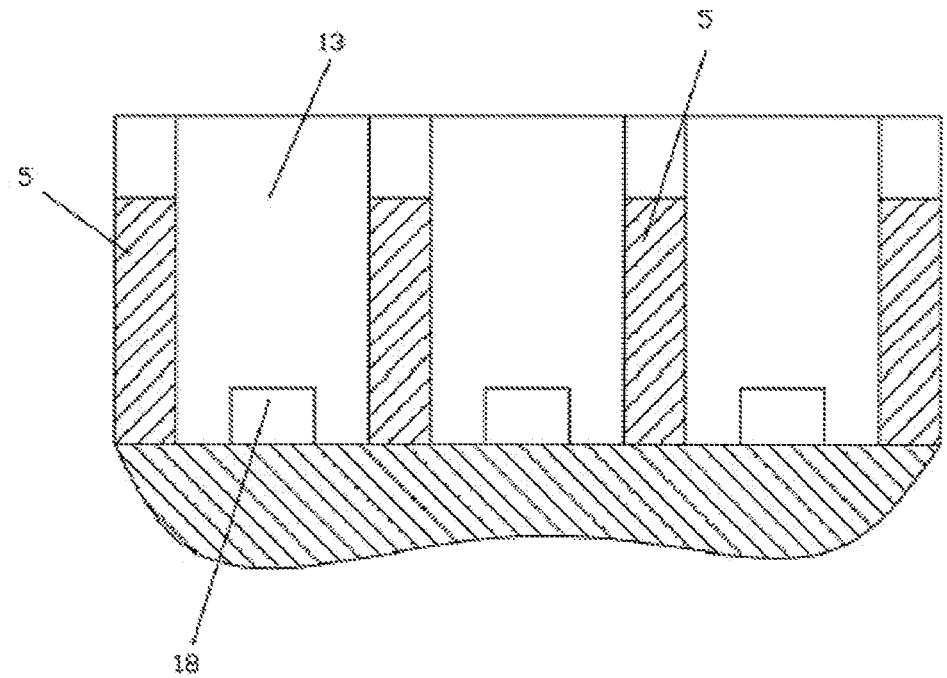
FIG. 10 is a structural view of rectangular communicating holes.
Figure 11:
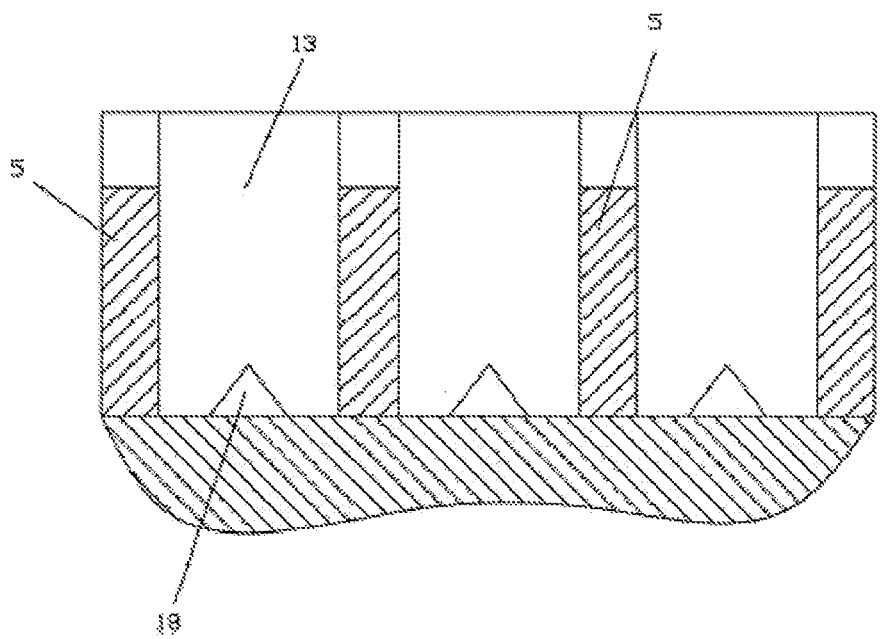
FIG. 11 is a structural view of triangular communicating holes.
Figure 12:
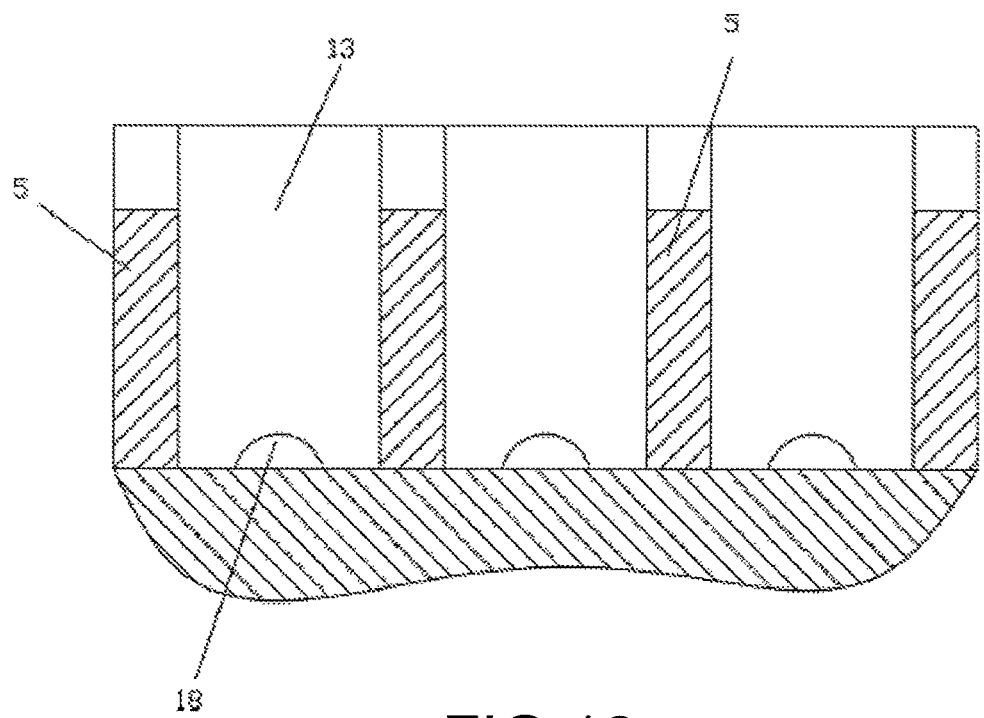
FIG. 12 is a structural view of arc communicating holes.

Further, reinforcing rib plates 13 are respectively arranged between every two adjacent first supporting rib plates 15 and between every two adjacent second supporting rib plates 6; the number of the reinforcing rib plates 13 between each two adjacent first supporting rib plates 5 and the number of the reinforcing rib plates 13 between each two adjacent second supporting rib plates 6 are set to be 1-5, communicating holes 18 are formed between the reinforcing rib plates 13 and the bottom surfaces of the first recessed grooves 7 or between the reinforcing rib plates 13 and the bottom surfaces of the second recessed grooves 8, and preferably, the communicating holes 18 are formed between the reinforcing rib plates 13 and the bottom surfaces of the first recessed grooves 7 and between the reinforcing rib plates 13 and the bottom surfaces of the second recessed grooves 8; the communicating holes 18 are openings which are formed in the reinforcing rib plates 13 and communicate with the bottom surfaces of the reinforcing rib plates 13, the openings are rectangular or arc or triangular (as shown in FIGS. 10, 11 and 12) or are of other shapes, further, the communicating holes 18 are gaps between the reinforcing rib plates 13 and the bottom surfaces of the first recessed grooves 7 and between the reinforcing rib plates 13 and the bottom surfaces of the second recessed grooves 8, and gap values are 1-3 mm; and the top surfaces of the reinforcing rib plates 13 are flush with the top surfaces of the first supporting rib plates 5 and the top surfaces of the second supporting rib plates 6.

The implementation also provides a steel pipe supporting device comprising a plurality of steel pipe supports sequentially arranged in parallel from bottom to top and two vertical connecting mechanisms 2 arranged at two ends of the plurality of steel pipe supports and used for connecting the plurality of steel pipe supports together; the number of vertical connecting mechanisms are set to be 2, and each of the two vertical connecting mechanisms comprises a pull rod 201, an upper connecting plate 208 arranged on the steel pipe support located at the topmost, a pull rod passing hole 202 formed in the upper connecting plate 208, a lower connecting plate 209 arranged on the steel pipe support located at the bottommost, a lower lateral pull rod clamping slot 210 arranged in the lower connecting plate 209, a middle connecting block 211 arranged on the rest steel pipe supports, a middle lateral pull rod clamping slot 212 formed in the middle connecting block 211, a threaded section 203 arranged at the upper end of the pull rod 201, a fastening nut 204 in threaded connection with the threaded section 203, a pull-away preventing part 205 arranged at the lower end of the pull rod 201 and used for preventing the pull rod 201 from being vertically pulled away from the lower lateral pull rod clamping slot 210 and a lateral barrier plate 206 used for preventing the pull-away preventing part 205 from sliding outwards; and two ends of the upper connecting plate 208 penetrate out of the steel pipe supports, the penetrating parts at two ends form a left end 208a and a right end 208b at the upper part, two ends of the lower connecting plate also penetrate out of the steel pipe supports to form two ends.

Figure 13:
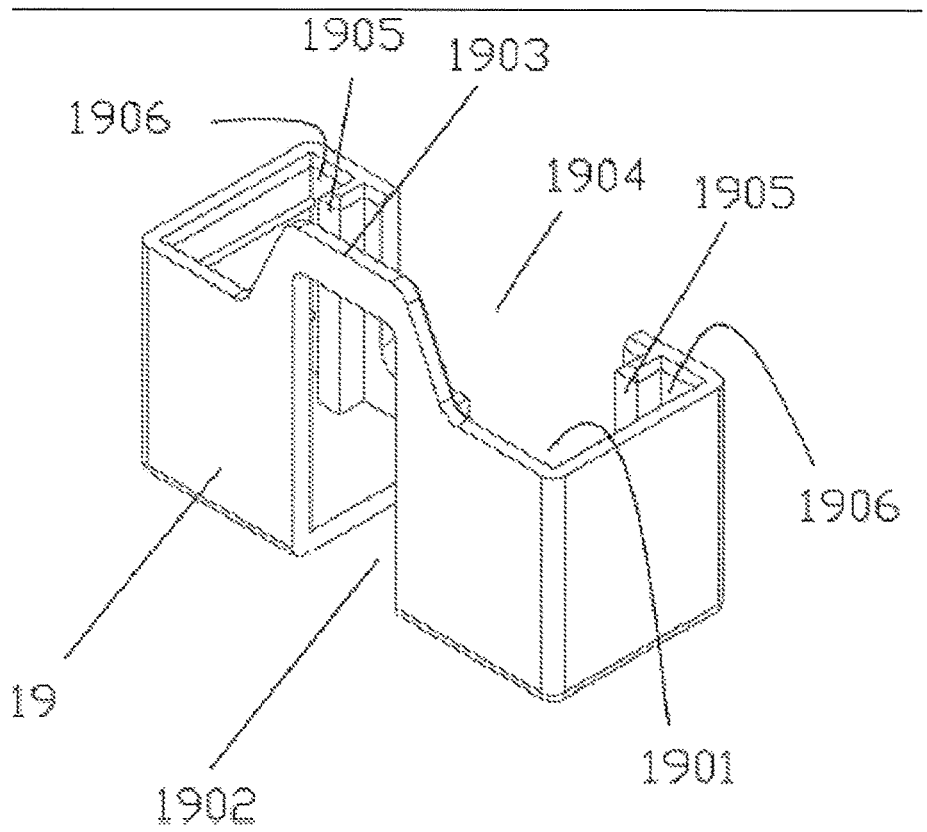
FIG. 13 is a schematic diagram of a lower end connecting block.
Figure 14:
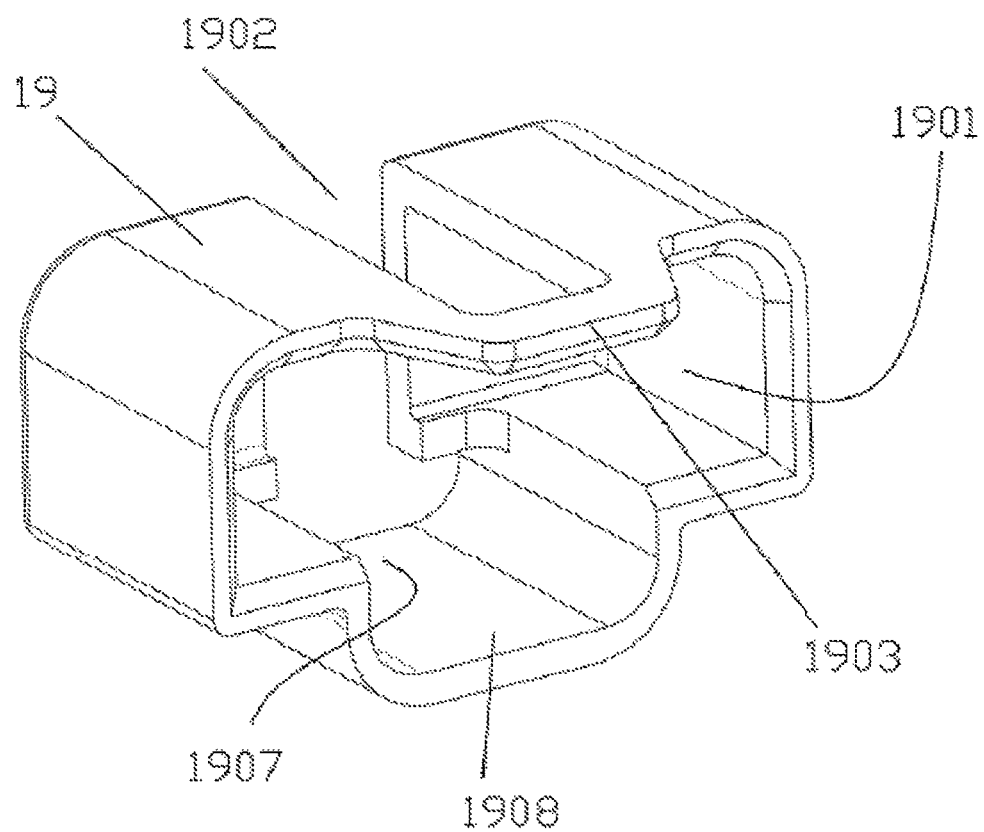
FIG. 14 is another schematic diagram of the lower end connecting block.

The plurality of steel pipe supports are vertically arranged, the pull rod passing hole 202 in the upper connecting plate 208 arranged on the steel pipe support located at the topmost, the lower lateral pull rod clamping slot 210 in the lower connecting plate 209 arranged on the steel pipe support located at the bottommost and the middle lateral pull rod clamping slot 212 in the middle connecting block 211 arranged on the steel pipe support located in the middle form a pull rod channel, that is, the pull rod passing hole 202, the middle lateral pull rod clamping slot 212 and the lower lateral pull rod clamping slot 210 form a channel for mounting the pull rod, the pull rod is located in the channel when being used for fixing the plurality of steel pipe supports, the pull rod 201 is a hard rod, has a round or polygonal cross section and generally adopts a steel rod, the pull rod passing hole 202 is a through hole and is formed in the upper connecting plate 208, the upper connecting plate 208 is in insertion connection with the supporting inner core, and the lower connecting plate is in insertion connection with the supporting inner core; the middle connecting block 211 is made of plastics, is inserted into the supporting inner core 102 or is connected to the supporting inner core 102 by injection, in the same way, the steel pipe support located at the topmost is provided with an upper end connecting block inserted into the supporting inner core, and the upper end connecting block is also made of plastics and can play a protection role; the steel pipe support located the bottommost is provided with a lower end connecting block inserted into the supporting inner core and made of plastics, in the implementation, the upper end connecting block and the lower end connecting block are same in structure as shown in FIG. 13 which is a structural view of the lower end connecting block 19, the lower end connecting block 19 is of a hollow shell structure and is provided with an insertion connection cavity 1901 and an open slot 1902 communicating with the insertion connection cavity 1901, the open slot 1902 allows the pull rod to penetrate through, an end retaining side 1903 is formed at the end of the open slot 1902, a bottom opening 1904 is formed in the side of the bottom opposite to the open slot 1902, two sides of the bottom opening 1904 are provided with two lateral baffles 1905, guiding mounting slots 1906 are formed between the lateral baffles 1905 and side plates of a hollow shell, and lateral plates at the extending ends of the lower connecting plate are inserted into the guiding mounting slots 1906 during mounting; preferably, the lower end connecting block 19 can also adopt a structure which is shown as FIG. 14 and is of a hollow shell structure provided with an insertion connection cavity 1901 and an open slot 1902 communicating with the insertion connection cavity 1901, the open slot 1902 allows the pull rod to penetrate through, an end retaining side 1903 is formed at the end of the open slot 1902, a bottom groove 1907 is formed in the side of the bottom opposite to the open slot 1902, and the bottom of the bottom groove 1907 is a bottom connecting plate 1908; due to the arrangement of the middle lateral pull rod clamping slot 212 and the lower lateral pull rod clamping slot 210, the pull rod can laterally enter so as to be conveniently mounted; a pair of locating planes which are mutually matched is arranged between the pull-away preventing part 205 and the bottom of the lower connecting plate, due to the arrangement of the pair of locating planes, the pull rod can be kept vertical, and is prevented from being inclined, so as to not affect the steel pipe fixing effect, and the bottom surface of the pull-away preventing part 205 is a spherical surface; each of the vertical connecting mechanisms 2 also comprises a lateral barrier plate 206 for preventing the pull-away preventing part 205 from sliding outwards, the lateral barrier plate 206 is formed by bending the end of the lower connecting plate, or the lateral barrier plate 206 is fixed on the lower connecting plate and has a bent end, the lateral barrier plate 206 prevents the pull-away preventing part 205 from sliding out of the lower lateral pull rod clamping slot 210 to further prevent the lower end of the pull rod from being inclined; and an anti-rotation part 207 matched with the lower lateral pull rod clamping slot 210 for preventing the pull rod 201 from rotating is arranged between the pull rod 201 and the pull-away preventing part 205, the anti-rotation part 207 is used for preventing the pull rod 201 from rotating so as to provide convenience for mounting the fastening nut on the threaded section 203, and the anti-rotation part 207 is provided with two anti-rotation sides so as to be matched with two sides of the lower lateral pull rod clamping slot 210. The anti-rotation part 207 in the implementation is rectangular and can also be shaped like a regular polygon or an approximate polygon or a cylinder, and the two anti-rotation sides are processed on the outer surface; and the pull rod, the pull-away preventing part and the anti-rotation part are integrally molded or are welded into a whole so as to be non-detachable.

Figure 5:
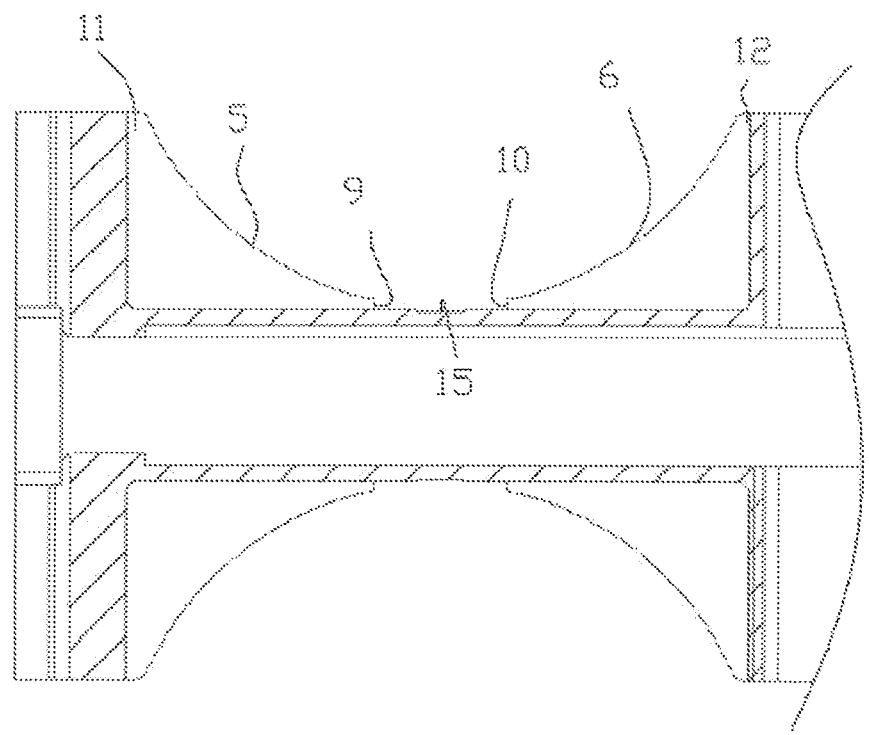
FIG. 5 is a schematic diagram of an embodiment 2 of the invention.

Embodiment 2: as shown in FIG. 5, differences from the embodiment 1 lie in that, the ends, close to the second supporting rib plates 6, of the first supporting rib plates 5 are provided with first step surfaces 9 intersected with the bottom surfaces of the steel pipe storage grooves 3, and the ends, close to the first supporting rib plates 5, of the second supporting rib plates 6 are provided with second step surfaces 10 intersected with the bottom surfaces of the steel pipe storage grooves 3; the heights of the first step surfaces and the second step surfaces are 1-3 mm; first transition connecting plates 11 are arranged between the first supporting rib plates 5 and the side surfaces of the steel pipe storage grooves 3; and second transition connecting plates 12 are arranged between the second supporting rib plates 6 and the side surfaces of the steel pipe storage grooves 3.

Figure 6:
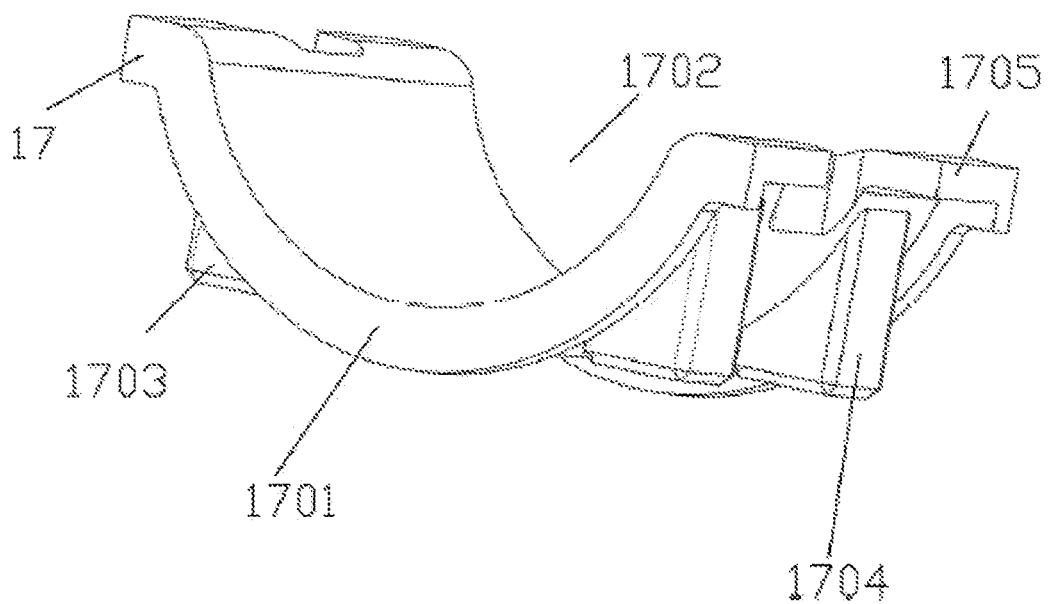
FIG. 6 is a schematic diagram of an embodiment 3 of the invention.

Embodiment 3: as shown in FIG. 6, differences from the embodiment 1 lie in that, the steel pipe support also comprises transition insertion parts 17 made of plastics or polyurethane, due to the presence of the transition insertion parts, the whole steel pipe support and the steel pipe supporting device can be adapted to steel pipes of different specifications, so that the efficiency is increased, and the application range is widened; each of the transition insertion parts comprises a insertion part body 1701, an arc groove 1702 formed in the insertion part body 1701, a first locating block 1703 and a second locating block 1704 arranged on the insertion part body 1701 and matched with each of the first recessed grooves 7 and each of the second recessed grooves 8, and an end pressing plate 1705 arranged at the end of the insertion part body 1701 and in contact with each of the spacing parts 4; and the arc grooves are used for placing the steel pipes, the first locating blocks and the second locating blocks are in insertion connection with the first recessed grooves 7 and the second recessed grooves 8, and the end pressing plates 1705 act on the spacing parts 4.

Figure 7:
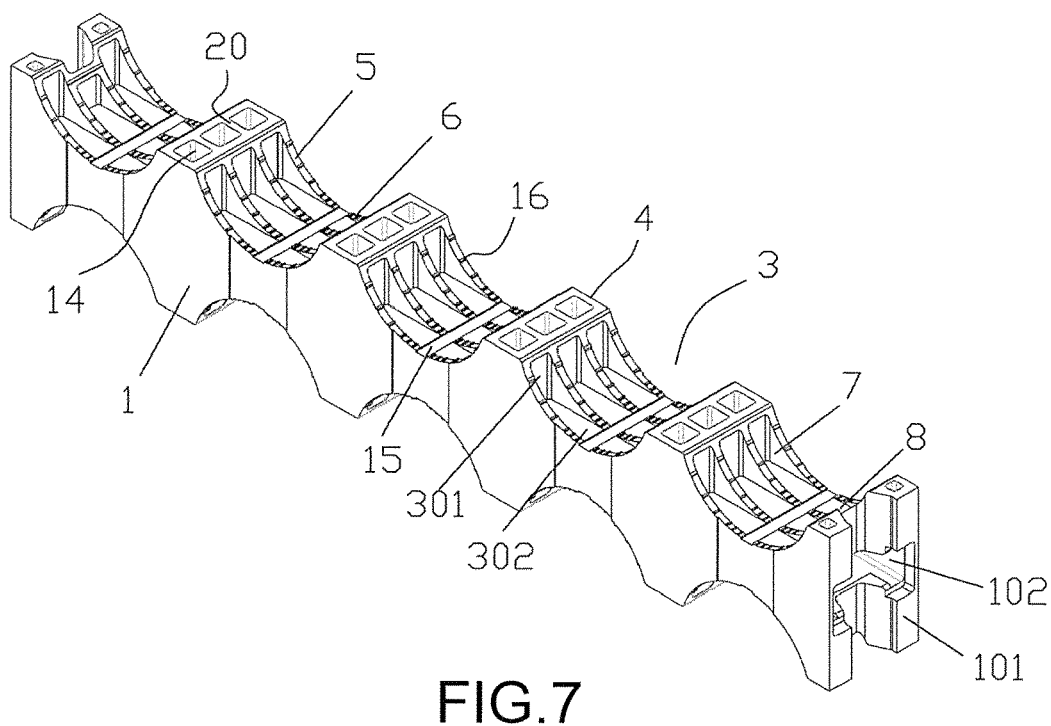
FIG. 7 is a schematic diagram of an embodiment 4 of the invention.

Embodiment 4: as shown in FIG. 7, differences from the embodiment 1 lie in that, the first supporting rib plates 5 and the second supporting rib plates 6 are provided with a plurality of raised rib plates 16 of which the number is set to be 3, 4, 5, 6, 7, 8 and the like, the raised rib plates 16 are arranged along the circumferential direction of the upper surfaces of the first supporting rib plates 5 and the second supporting rib plates 6, the cross sections of the raised rib plates 16 are shaped like rectangles or isosceles trapezoids or arcs, and due to the presence of the raised rib plates, the steel pipes can be better placed, and the area in contact with the steel pipes can be further reduced.

Figure 8:
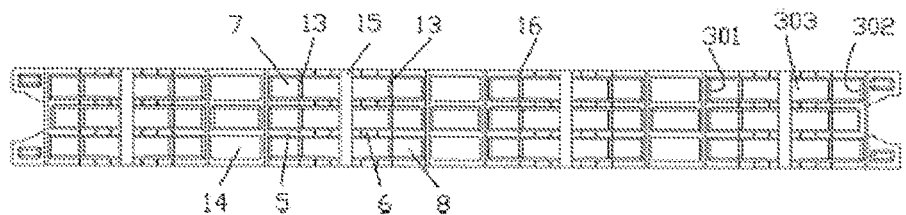
FIG. 8 is a schematic diagram of an embodiment 5 of the invention.
Figure 9:
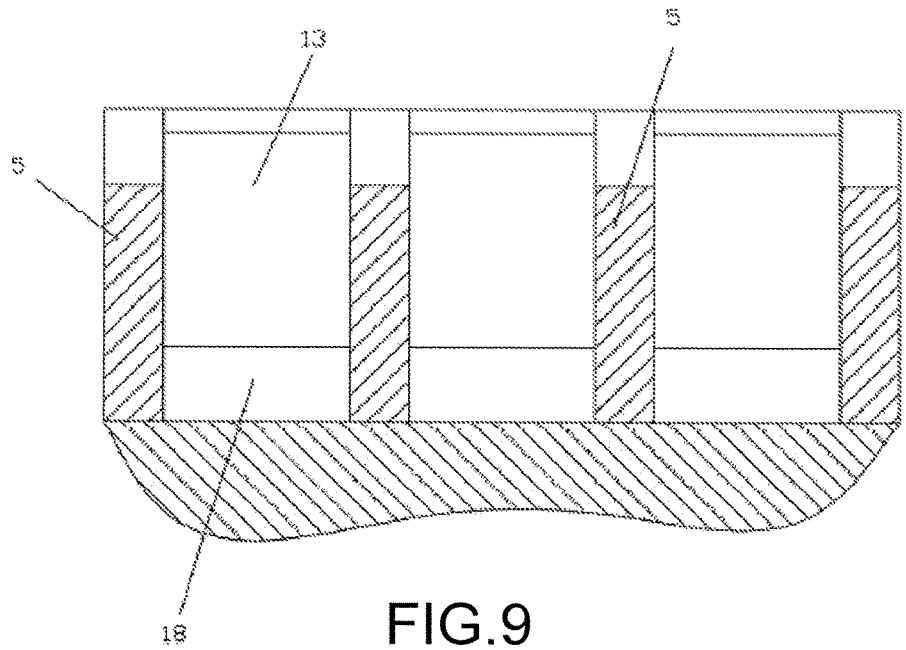
FIG. 9 is a schematic diagram that reinforcing rib plates are arranged on first supporting rib plates.

Embodiment 5: as shown in FIGS. 8 and 9, differences from the embodiment 1 lie in that, the first supporting rib plates 5 and the second supporting rib plates 6 are provided with a plurality of raised rib plates 16 of which the number is set to be 3, 4, 5, 6, 7, 8 and the like, the raised rib plates 16 are arranged along the circumferential direction of the upper surfaces of the first supporting rib plates 5 and the second supporting rib plates 6, the cross sections of the raised rib plates 16 are shaped like rectangles or isosceles trapezoids or arcs, and due to the presence of the raised rib plates, the steel pipes can be better placed, and the area in contact with the steel pipes can be further reduced; the reinforcing rib plates 13 are arranged between every two adjacent first supporting rib plates 5 and between every two adjacent second supporting rib plates 6; the number of the reinforcing rib plates 13 arranged between each two adjacent first supporting rib plates 5 and the number of the reinforcing rib plates arranged between each two adjacent second supporting rib plates 6 are set to be 1-5, the communicating holes 18 are formed between the reinforcing rib plates 13 and the bottom surfaces of the first recessed grooves 7 or between the reinforcing rib plates 13 and the bottom surfaces of the second recessed grooves 8, and preferably, the communicating holes 18 are formed between the reinforcing rib plates 13 and the bottom surfaces of the first recessed grooves 7 and between the reinforcing rib plates 13 and the bottom surfaces of the second recessed grooves 8; the communicating holes 18 are openings which are formed in the reinforcing rib plates 13 and communicate with the bottom surfaces of the reinforcing rib plates 13, the openings are rectangular or arc or triangular or are of other shapes, further, the communicating holes 18 are gaps between the reinforcing rib plates 13 and the bottom surfaces of the first recessed grooves 7 and between the reinforcing rib plates 13 and the bottom surfaces of the second recessed grooves 8, and gap values are 1-3 mm; and further, the top surfaces of the reinforcing rib plates 13 are flush with the top surfaces of the first supporting rib plates 5 and the top surfaces of the second supporting rib plates 6.

Embodiment 6: differences from the embodiment 1 lie in that, the number of the first supporting rib plates 5 and the number of the second supporting rib plates 6 are respectively set to be 2, 3-6 reinforcing rib plates 13 are arranged between two of the first supporting rib plates 5 and between two of the second supporting rib plates 6, the communicating holes 18 are formed between the reinforcing rib plates 13 and the bottom surfaces of the first recessed grooves 7 or between the reinforcing rib plates 13 and the bottom surfaces of the second recessed grooves 8, and preferably, the communicating holes 18 are formed between the reinforcing rib plates 13 and the first recessed grooves 7 and between the reinforcing rib plates 13 and the second recessed grooves 8; the communicating holes 18 are openings which are formed in the reinforcing rib plates 13 and communicate with the bottom surfaces of the reinforcing rib plates 13, and the openings are rectangular or arc or triangular or are of other shapes; and further, the top surfaces of the reinforcing rib plates 13 are flush with the top surfaces of the first supporting rib plates 5 and the top surfaces of the second supporting rib plates 6.

The invention claimed is:
1. A steel pipe support, comprising:
a steel pipe supporting part;
a supporting inner core arranged inside the steel pipe supporting part;
a plurality of steel pipe storage grooves formed in the steel pipe supporting part and arranged along a length direction of the steel pipe supporting part; and
spacing parts arranged between adjacent steel pipe storage grooves from said plurality of steel pipe storage grooves, wherein at least two first supporting rib plates are arranged at a first side of each one of the steel pipe storage grooves and at least two second supporting rib plates are arranged at a second side of each one of the steel pipe storage grooves, first recessed grooves are formed between every two adjacent first supporting rib plates from said at least two first supporting rib plates, and second recessed grooves are formed between every two adjacent second supporting rib plates from said at least two second supporting rib plates;
wherein each one of the first supporting rib plates and each one of the second supporting rib plates comprises a plurality of raised rib plates, the plurality of raised rib plates is arranged along a circumferential direction of upper surfaces of the first supporting rib plates and upper surfaces of the second supporting rib plates respectively;
wherein reinforcing rib plates are arranged between every two adjacent first supporting rib plates and between every two adjacent second supporting rib plates respectively;
wherein first communicating holes are formed between first corresponding reinforcing rib plates from said reinforcing rib plates and bottom surfaces of the first recessed grooves and second communicating holes are formed between second corresponding reinforcing rib plates from said reinforcing rib plates and bottom surfaces of the second recessed grooves, and the first communicating holes are gaps between the first corresponding reinforcing rib plates and the bottom surfaces of the first recessed grooves and the second communicating holes are gaps between the second corresponding reinforcing rib plates and the bottom surfaces of the second recessed grooves for achieving drainage and ventilation.

2. The steel pipe support of claim 1, wherein the upper surfaces, which are in contact with steel pipes, of the first supporting rib plates and the second supporting rib plates are arc surfaces.

3. The steel pipe support of claim 2, wherein cross sections of the raised rib plates are rectangles, isosceles trapezoids, or arcs.

4. The steel pipe support of claim 2, wherein first ends, which are adjacent to the second supporting rib plates, of the first supporting rib plates are provided with first step surfaces that engage with bottom surfaces of the steel pipe storage grooves, and second ends, which are adjacent to the first supporting rib plates, of the second supporting rib plates are provided with second step surfaces intersected with the bottom surfaces of the steel pipe storage grooves.

5. The steel pipe support of claim 2, wherein at least one axial through groove is formed in a bottom surface of each of the steel pipe storage grooves.

6. The steel pipe support of claim 2, wherein the steel pipe support further comprises transition insertion parts, each of the transition insertion parts comprises:
an insertion body, an arc groove formed in the insertion body, a first locating block and a second locating block arranged on the insertion body and matched with each of the first recessed grooves and each of the second recessed grooves respectively, and an end pressing plate arranged at an end of the insertion body and in contact with each of the spacing parts.

7. The steel pipe support of claim 1, wherein the first supporting rib plates and the second supporting rib plates are symmetrically arranged or staggered at two sides of center sections of the steel pipe storage grooves.

8. The steel pipe support of claim 7, wherein vertical openings are formed in top surfaces of the spacing parts, a spacing plate is arranged between every two adjacent vertical openings, and a position of each spacing plate corresponds to those of the first supporting rib plates and the second supporting rib plates.

9. The steel pipe support of claim 1, wherein cross sections of the raised rib plates are rectangles, isosceles trapezoids, or arcs.

10. The steel pipe support of claim 1, wherein first ends, which are adjacent to the second supporting rib plates, of the first supporting rib plates are provided with first step surfaces that engage with bottom surfaces of the steel pipe storage grooves, and second ends, which are adjacent to the first supporting rib plates, of the second supporting rib plates are provided with second step surfaces intersected with the bottom surfaces of the steel pipe storage grooves.

11. The steel pipe support of claim 1, wherein at least one axial through groove is formed in a bottom surface of each of the steel pipe storage grooves.

12. The steel pipe support of claim 1, wherein the steel pipe support further comprises transition insertion parts, each of the transition insertion parts comprises:
an insertion body, an arc groove formed in the insertion body, a first locating block and a second locating block arranged on the insertion body and matched with each of the first recessed grooves and each of the second recessed grooves respectively, and an end pressing plate arranged at an end of the insertion body and in contact with each of the spacing parts.

13. A steel pipe supporting device, comprising a plurality of steel pipe supports of claim 1, wherein the plurality of steel pipe supports are sequentially arranged in parallel from a bottom to a top, and two vertical connecting mechanisms which are arranged at two ends of each of the plurality of steel pipe supports and are used for connecting the plurality of steel pipe supports.

14. The steel pipe supporting device of claim 13, wherein each of the vertical connecting mechanisms comprises:
a pull rod, an upper connecting plate arranged on a topmost steel pipe support from said plurality of steel pipe supports, a pull rod passing hole formed in the upper connecting plate, a lower connecting plate arranged on a bottommost steel pipe support from said plurality of steel pipe supports, a lower lateral pull rod clamping slot arranged in the lower connecting plate, a middle connecting block arranged between the topmost steel pipe support and the bottommost steel pipe support of the steel pipe supports, a middle lateral pull rod clamping slot formed on the middle connecting block, a threaded section arranged at an upper end of the pull rod, a fastening nut in threaded connection with the threaded section, a pull-away preventing part arranged at an lower end of the pull rod for preventing the pull rod from being vertically pulled away from the lower lateral pull rod clamping slot, and a lateral barrier plate used for preventing the pull-away preventing part from sliding outwards.

15. The steel pipe supporting device of claim 14, wherein an anti-rotation part is matched with each lower lateral pull rod clamping slot for preventing each pull rod from rotating respectively, each anti-rotation part is arranged between each pull rod and each pull-away preventing part respectively, each anti-rotation part is provided with two anti-rotation sides matched with each lower lateral pull rod clamping slot, and each pull rod, each pull-away preventing part, and each anti-rotation part respectively are integrally molded or welded.

16. A steel pipe supporting device, comprising a plurality of steel pipe supports of claim 2, wherein the plurality of steel pipe supports are sequentially arranged in parallel from a bottom to a top, and two vertical connecting mechanisms which are arranged at two ends of each of the plurality of steel pipe supports and are used for connecting the plurality of steel pipe supports.

17. The steel pipe supporting device of claim 16, wherein each of the vertical connecting mechanisms comprises:
a pull rod, an upper connecting plate arranged on a topmost steel pipe support from said plurality of steel pipe supports, a pull rod passing hole formed in the upper connecting plate, a lower connecting plate arranged on a bottommost steel pipe support from said plurality of steel pipe supports, a lower lateral pull rod clamping slot arranged in the lower connecting plate, a middle connecting block arranged between the topmost steel pipe support and the bottommost steel pipe support of the steel pipe supports, a middle lateral pull rod clamping slot formed on the middle connecting block, a threaded section arranged at an upper end of the pull rod, a fastening nut in threaded connection with the threaded section, a pull-away preventing part arranged at an lower end of the pull rod for preventing the pull rod from being vertically pulled away from the lower lateral pull rod clamping slot, and a lateral barrier plate used for preventing the pull-away preventing part from sliding outwards.

18. The steel pipe supporting device of claim 17, wherein an anti-rotation part is matched with each lower lateral pull rod clamping slot for preventing each pull rod from rotating respectively, each anti-rotation part is arranged between each pull rod and each pull-away preventing part respectively, each anti-rotation part is provided with two anti-rotation sides matched with each lower lateral pull rod clamping slot, and each pull rod, each pull-away preventing part, and each anti-rotation part respectively are integrally molded or welded.

* * * * *